United States Patent Office 3,515,878
Patented June 2, 1970

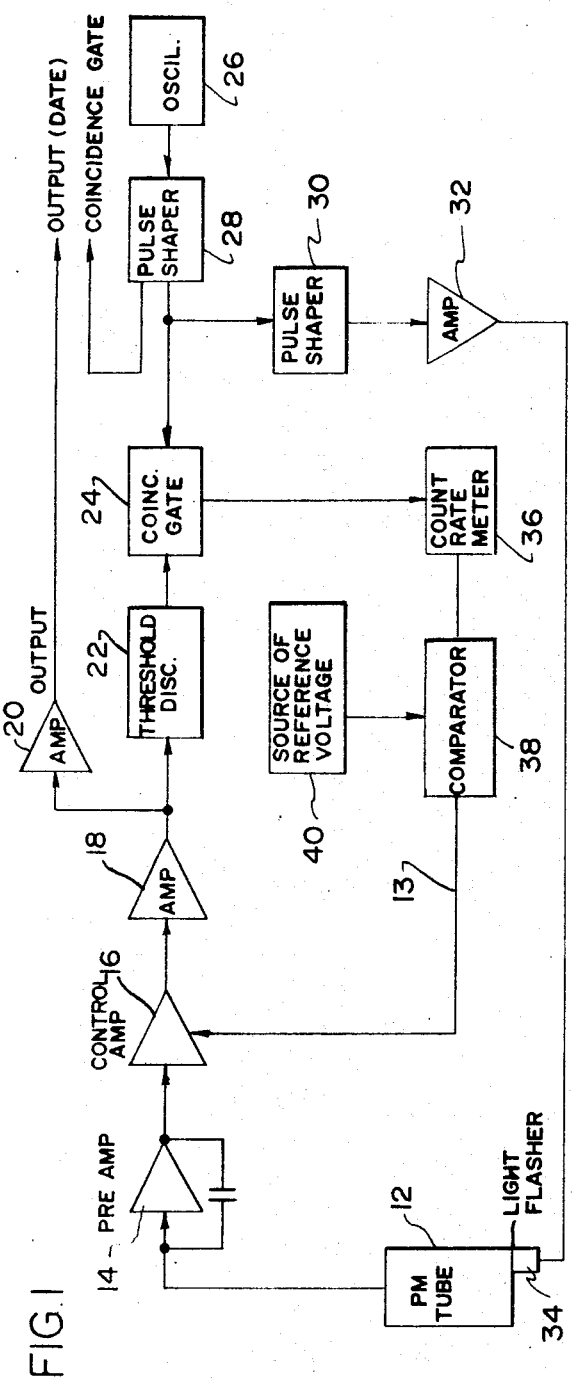
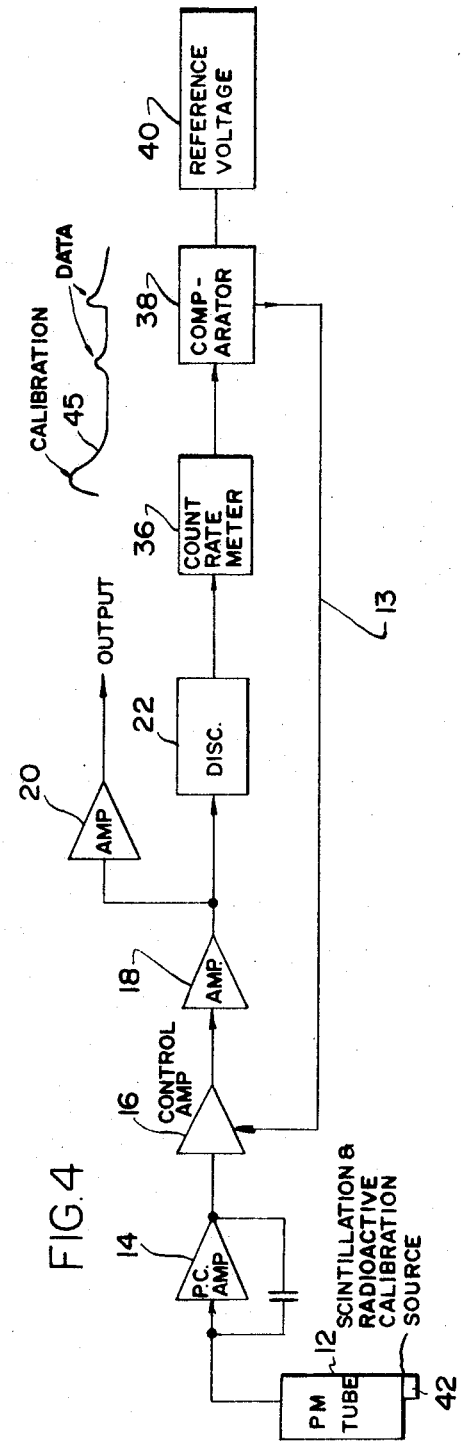

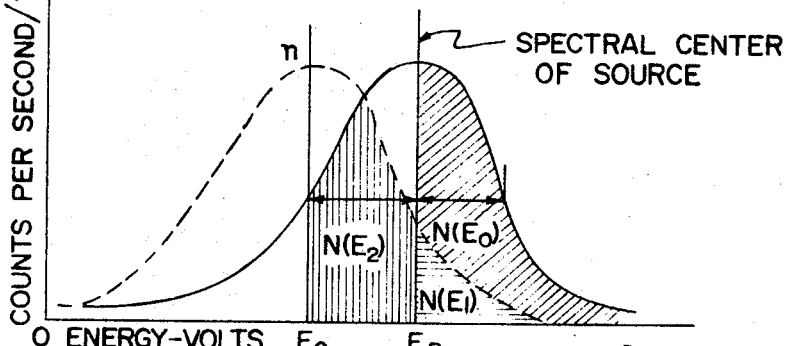

3,515,878
GAIN CONTROL SYSTEM FOR PHOTOMULTIPLIER USING STANDARDIZATION PULSES
Louis Ried, Jr., and Jerry R. Gilland, Boulder, Colo., assignors to Ball Brothers Research Corporation, Boulder, Colo., a corporation of Colorado
Filed Dec. 28, 1967, Ser. No. 694,131
Int. Cl. H01j 39/12
U.S. Cl. 250—207         8 Claims

ABSTRACT OF THE DISCLOSURE

A gain control for a photomultiplier tube system is disclosed for automatically stabilizing the gain of the system and compensating for gain variation in the photomultiplier tube.

BACKGROUND OF THE INVENTION

Field of the invention

The latest patents known to applicant of the type of this invention are listed hereinbelow.

Description of the prior art

The pertinent prior art known to applicant is as follows: 2,982,860, Nehrbas et al.; 3,183,353, Baldwin; 3,171,032, Holt; 3,184,597, Scherbatskoy.

The versatility of photomultiplier tubes permits a wide variety of applications. For example, photomultiplier tubes are used extensively as high amplification detectors for emissions in the infrared, visible and ultraviolet region of the electromagnetic spectrum. In one application, charged particles and events arising from shorter electromagnetic wavelengths, such as X-ray and gamma rays, may be detected by scintillators which convert each event into longer wavelength emissions that can be sensed by the photomultiplier photocathode. Each light quanta from the photocathode undergoes statistical electron multiplication to provide a high amplification which thus permits the detection of very small signals which cannot be practically accomplished by any other device such as solid state detectors or proportional counters.

A further advantage of a photomultiplier tube utilizing system is that less electronic amplifiers are needed thus reducing the undesired noise and reducing the complexity of the system.

Since the photomultiplier has linear gain and the output signal is directly proportional to the energy of the ionizing event at the photocathode, photomultiplier tubes have found considerable application in the field of reactor and space physics research as counters or detectors for pulse height spectrum analysis, time of flight studies, reactor control and monitoring alarms sensors, and process control.

However, photomultiplier tubes are susceptible to amplification, or gain, instability. Photocathode aging, dynode deterioration due to gaseous impurities, and mechanical tolerances altered by thermal changes are some of the common causes of photomultiplier tube gain changes. It has been found that the stability of photomultiplier tubes vary considerably with manufacturers, and with different production runs; and, gain variations may appear as drifts or as gain hysterisis.

Some effects causing instability can be traced to uncontrollable variations such as trace impurities in glass or gaseous material used in the photomultiplier tube fabrication. Also, exposure to strong signals will cause either permanent photomultiplier tube gain, loss, or increase existing gain instability. Thus, overall, the most significant characteristic of photomultiplier tube gain variations is the unpredictability of the instability.

The above cited patents disclose photomultiplier tubes with stabilized gain and having various circuitry for stabilizing the gain of the photomultiplier tube.

SUMMARY OF THE INVENTION

This invention relates to a system and technique for providing automatic gain control for photomultiplier tubes and for stabilizing the gain of the associated system and compensating for gain variations in the photomultiplier tube.

The system includes a feedback loop, and any error or change in the photomultiplier gain is converted to a proportional voltage which is used to change the gain of an associated gain control amplifier to thus maintain the output voltage of the system constant.

BRIEF DESCRIPTION OF THE DRAWINGS

FIG. 1 is a block diagram showing one embodiment of the invention;

FIG. 2 is a graphical representation on the distribution curve useful in explaining the invention of FIG. 1;

FIG. 3 is another graph useful in explaining the operation of the invention of FIG. 1; and FIG. 4 is another embodiment of the invention.

DESCRIPTION OF THE PREFERRED EMBODIMENTS

A block diagram of the photomultiplier gain control system 11, according to the invention, is shown in FIG. 1. The gain control system includes a feedback loop 13 for controlling or correcting the output of the system to compensate for any variations of the output from the associated photomultiplier tube 12. Before describing the circuitry of the invention, it may be advantageous to consider some theoretical aspects thereof.

Theoretical considerations

The typical differential spectral distribution of a monoenergetic source is shown in FIG. 2. Ideally, the center of the distribution ($E_R$) would be a straight line through $E_R$ having a count rate of a given number of counts per second. The source of energy E, expressed in volts is proportional to a quantity of charge $q=EK$ delivered at the output of a photomultiplier tube. Due to the statistical nature of charged particle interaction in the scintillator, light quanta in a photocathode and electron multiplication in the photomultiplier tube, the peak exhibits a finite width which may be expressed in the percent resolution at full width taken at half maximum height of the peak. The integral of the differential spectrum, as shown in FIG. 3, will have the spectral center at the point of maximum inflection where the rate of change of the slope is minimum. This is the location of maximum sensitivity for detection of any horizontal spectrum movement.

With reference to FIG. 2, the probability that a given number of counts per second will occur above the reference level $E_R$ can be indicated as N ($E_O$) [as shown by the angular shading in FIG. 2 and indicates $N(E_1)$ as shown in FIG. 2]. If the spectrum moves to the left corresponding to a photomultiplier tube gain loss, the new value $N(E_1)$ [as shown by the horizontal shading in FIG. 2] will be a measure of the number of counts per second above $E_R$ after the change. The difference of the two values $N(Ea)$ [as shown by vertical shading in FIG. 2] is an error signal that can be used to correct the gain loss. The same reasoning applies for a gain increase except that the spectrum shifts to the right and the error signal will change sign.

A similar error signal may be derived from the integral spectrum of FIG. 3 where N(E) is the probability density function where $n(E)\ dE$ is the probility that E will be found in the increment $E \pm dE/2$. Since the incremental area equal to $dE$ or near $E_R$ is largest, maximum sensitivity for spectrum movement with respect to the fixed reference level $E_R$ will be near the center of the distribution. Before any gain change, the area under the curve which means the probability that a given number of counts per second will occur above the reference level $E_R$ can be expressed as:

$$N(E_O) = \int E_R n(E) dE = N_R \quad (1)$$

where $N_R$ = counting rate of one half of the spectrum. After a gain change the counts per second lost between the reference level $E_R$ and the new spectrum center $E_O$ will be $$N(E_2) = \int_{E_R}^{E_O} n(E) dE = f(E_R - E_O) \quad (2)$$

The error signal will be the remaining counts per second above $E_R$ so that $$\text{Error} = \Delta N(E) = n_R - f(E_R - E_O) \quad (3)$$

As before, the same reasoning will apply for a gain increase except the spectrum would shift to the right and the error signal would change sign.

In practice a voltage sensitive discriminator is used to count half the known spectrum counts above a trigger level, $k E_R$, where $k$ is a selected constant.

CONTINUATION OF DESCRIPTION OF PREFERRED EMBODIMENTS

In FIG. 1, a photomultiplier (PM) tube of any suitable known design is indicated by the block 12. The data signals to be processed are received by the PM tube 12. The data is internally processed in the PM tube 12 and coupled through preamplifier 14, a control amplifier 16, a pulse amplifier 18, and an output buffer amplifier 20 as output data to the external equipment.

Note, at the outset, that all of the electronic circuitry indicated by the blocks of FIG. 1 represent well-known and readily available circuitry and hence the units per se will not be described other than in their overall relation to the system.

In order to provide a control signal for stabilizing the system, the output from the pulse amplifier 18 is also coupled through a threshold discriminator 22 and a coincidence gate 24 forming a part of a feedback loop, to be described. A second input to the coincidence gate 24 is a signal from an oscillator 26 (which is one embodiment provides a 200 cycle per second signal) which is coupled through a pulse shaper 28 to the coincidence gate 24. As is known, the coincidence gate 24 is energized when the pulse input from the threshold discriminator 22 and the pulse shaper 28 are coincident.

An output from the pulse shaper 28 is also coupled through a second pulse shaper 30 and an amplifier 32 to a light flasher 34, also of any suitable design. The light flasher 34 is actuated by the signal from oscillator 26 to provide calibration pulses to the PM tube 12. The PM tube 12 output due to the calibration pulses is amplified by amplifiers 14, 16 and 18, as will be described.

The coincidence gat 24 serves to separate the PM tube 12 output representative of the input data from PM tube 12 output representative of the light flasher 34 calibration pulses. Upon energization of coincidence gate 24, a low impedance path is provided for the calibration pulses which are thence coupled through gate 24 to a count rate meter 36.

Any change in the output $E_O$ (from the discriminator 22) corresponding to the pulse height peak or spectrum center is corrected for variations of $E_{in}$ (the input to the discriminator 22) by the continuously sensing the difference in integral counting rates $E_R$ at the threshold level before and after gain change. The error counting rate $f(E_R - E_O)$ described above is converted to a proportional direct current voltage by the count rate meter 36.

The output from count rate meter 36 is coupled to a comparator 38 which receives a second input from a source 40 of reference voltage. The comparator compares the direct current voltage output from the count rate meter 36 with the reference voltage from source 40 to provide a negative feedback signal to change the gain of the control amplifier 16 to tend to maintain a constant system output level. It has been found that the change of gain of the control amplifier required to maintain a constant system output level can be determined by deriving the system transfer function directly by known formulae or by resorting to known graphical analysis and design.

Note that energization of the coincidence gate 24 will also prevent the external equipment from sensing the output signals from PM tube 12 during the period when flasher 34 is in operation. The resulting "dead time" required for calibration purposes is relatively small and fully predictable and hence it is not objectionable.

A second and somewhat simplified embodiment of the invention of FIG. 1 and useful in certain applications is shown in FIG. 4, wherein a scintillator and radioactive calibration source 42 is utilized as a reference spectrum in lieu of light flasher 34 of FIG. 1. Note that the embodiment of FIG. 4 utilizes some of the similar units of FIG. 1 and similar elements in FIG. 4 and FIG. 1 are indicated by the same reference numerals.

In the circuit of FIG. 4 the PM tube 12 output is coupled through preamplifier 14 to the control amplifier 16, a pulse amplifier 18 and an output buffer amplifier 20, similarly as in FIG. 1. Also similar to FIG. 1, a portion of the output from pulse amplifier 18 is coupled through a threshold discriminator 22 to the count rate meter 36. The count rate meter 36 provides a direct current output pulse representative of the error counting rate to the comparator 38. The comparator 38 compares the direct current voltage output from the count rate meter 36 with the reference voltage from source 40 to provide a signal to change the gain of the control amplifier 16, similarly as in FIG. 1.

Note, therefore, that the operation of the circuit of FIG. 4 is similar to that of FIG. 1 with the exception that in FIG. 4 the PM tube 12 output due to the data input pulse is not separated from the PM tube 12 output pulses due to the radioactive calibration pulses. Thus, in the operation of the circuit of FIG. 4, the data response or events must be maintained at a level below the calibration pulses, see the waveform sketch 45 in FIG. 4.

While the invention has been particularly shown and described with reference to preferred embodiments thereof, it will be understood by those skilled in the art that various changes in form and details may be made therein without departing from the spirit and scope of the invention.

What is claimed is:

1. A gain control system for use with a photomultiplier tube arranged to receive and amplify input data comprising, in combination:
   means for coupling output data pulses from the photomultiplier tube to a utilization means;
   means for activating said tube to provide standardization output pulses for calibration purposes;
   sampling means arranged to receive said output pulses from said photomultiplier tube and responsive thereto providing output pulses substantially reflecting only said standardization pulses from said tube;
   converting means for receiving the output from said sampling means and developing a direct current voltage indicative of said standardization pulses;
   a source of reference voltage; and
   comparator means arranged to receive the direct current voltage from said converting means and said reference voltage and providing a difference direct current voltage for automatically controlling the gain of the output coupled to said utilization means.

2. A gain control system for use with a photomultiplier tube arranged to receive and amplify input data comprising, in combination:

means including a control amplifier for coupling the output from the photomultiplier tube to a utilization means;
means for activating said tube to provide signals for calibration purposes;
a threshold discriminator;
means for continuously coupling said calibration signals to said discriminator;
a count rate meter arranged to receive said calibration signals through said discriminator and provide a direct current voltage in response thereto;
a source of reference voltage;
comparator means arranged to receive the direct current voltage from said count rate meter and said reference voltage;
said comparator providing an output to said control amplifier representative of the differential of said direct current voltage and said reference voltage to continuously control the gain of said control amplifier and stabilize the gain of the system and compensate for variations in the output from said photomultiplier tube.

3. A gain control system for a photomultiplier tube as in claim 2 wherein said means for activating said tube comprises:

a light flasher means for providing light pulses to said tube for purposes of calibrating said tube, said system further including,
oscillator means for providing pulses to activate said light flasher;
a coincidence gate arranged to receive an input from said oscillator and a second input from said discriminator which energize said coincidence gate; and
said count rate meter is arranged to receive an input through said discriminator and said coincidence gate whereby the calibration signals are separated from the data pulses.

4. A gain control system as in claim 2 wherein a scintillator and radioactive source are provided to continuously activate said tube for purposes of calibration.

5. A gain control system as in claim 3 wherein said oscillator activates said light flashes to provide calibration pulses interspersed with data pulses.

6. A gain control system as in claim 1 wherein said means for coupling output data pulses from the photomultiplier tube to a utilization means includes a control amplifier; and wherein the difference voltage from said comparator means is coupled to said control amplifier to vary the gain thereof and to stabilize the gain of said system by compensating for variations in the output from said photomultiplier tube.

7. A method for controlling the gain of a photomultiplier tube system comprising the steps of:

activating said photomultiplier tube to provide output data pulses in response to data signals;
interspersing calibrating pulses with said data pulses to activate said photomultiplier tube;
automatically separating the calibration pulses from the data pulses at the output of said photomultiplier tube;
providing a direct current voltage corresponding only to said calibrating pulses;
comparing said direct current voltage with a reference voltage; and
providing a feedback voltage to automatically and continuously vary the gain of said system to stabilize the gain of the system.

8. The method as defined in claim 7 further including the steps of:

amplifying said interspersed calibrating pulses and data pulses;
establishing a threshold level and detecting only the calibrating pulses interspersed with the data pulses;
counting said detected calibrating pulses; and
wherein the direct current voltage corresponding only to said calibrating pulses corresponds to the number of counted calibrating pulses, and the feedback voltage is provided to control the amplification of said calibrating pulses and data pulses to automatically and continuously vary the gain of said system to stabilize the gain of the system.

References Cited

UNITED STATES PATENTS

| 3,004,167 | 10/1961 | Owen | 250—207 |
|---|---|---|---|
| 3,042,805 | 7/1962 | Boersma | 250—207 |

RALPH G. NILSON, Primary Examiner

MARTIN ABRAMSON, Assistant Examiner

U.S. Cl. X.R.

250—71.5